United States Patent [19]

Kuchta

[11] Patent Number: 4,961,386
[45] Date of Patent: Oct. 9, 1990

[54] ESCAPEMENT MECHANISM FOR GRAVITY FED TROLLEYS WITH TROLLEY ACCELERATING CAPABILITY

[75] Inventor: Richard Kuchta, Tolland, Conn.

[73] Assignee: Gerber Garment Technology, Inc., Tolland, Conn.

[21] Appl. No.: 315,152

[22] Filed: Feb. 24, 1989

[51] Int. Cl.⁵ .............................................. B61K 7/00
[52] U.S. Cl. .................................... 104/250; 104/253
[58] Field of Search ............... 104/253, 165, 250, 249, 104/252; 221/289, 299; 198/463.6, 465.4

[56] References Cited

U.S. PATENT DOCUMENTS 3,055,311 9/1962 Sgriccia .............................. 104/250

Primary Examiner—Andres Kashnikow
Assistant Examiner—Virna Lissi Mojica
Attorney, Agent, or Firm—McCormick, Paulding & Huber

[57] ABSTRACT

Gravity fed trolleys are stacked up for storage on a rail and the lead trolley is accelerated downstream away from the stack by an air operated device that includes a single bellcrank with trolley engaging surface portions that not only hold back the stack, but that also accelerate each trolley away from the stack to avoid depending solely on the potential energy of the trolley to move it out of the stack.

12 Claims, 5 Drawing Sheets

ESCAPEMENT MECHANISM FOR GRAVITY FED TROLLEYS WITH TROLLEY ACCELERATING CAPABILITY

This invention relates generally to escapement mechanisms of the type adapted to index one of a plurality of stacked trolleys provided on an inclined gravity biased conveyor system, and deals more particularly with an escapement mechanism that not only permits the first trolley in the stack to be released for movement downstream on the rail, but which also provides for accelerating the trolley in the downstream direction.

BACKGROUND OF INVENTION

The environment for the present invention is disclosed in issued U.S. Pat. No. 4,615,273 entitled "Conveyorized Transport System" and a typical prior art escapement mechanism is shown in U.S. Pat. No. 4,667,602 entitled "Escapement Mechanism". Another related disclosure is contained in Ser. No. 249,442, filed Sept. 6, 1988. These disclosures describe the environment for the present invention and are incorporated by reference herein.

Workpiece conveyor systems of the type with which this invention is particularly suited may, for example, be used in a garment making plant to carry pieces, selectively, into and through a series of work stations provided alongside a main conveyor. Without a conveyor system of this type the garment workers not only perform the work operations provided at the various work stations, but additional workers must be assigned to; punch labels that are in turn attached to each workpiece to make a record of its status; sort the workpieces; and transport them usually manually to and from several such work stations. The number of steps involved leads to a labor intensive plant and creates other problems in the assembly process. For example, the time it takes a worker to perform various tasks is generally unpredictable and difficult for supervisory personnel to keep track of. Also, it can be difficult to keep track of the workpieces and of the time required for these pieces to travel to and from the various work stations. In order to provide a more accurate scheduling of such work it is commonplace for workers to accumulate many workpieces before carrying them to a subsequent work station. As a result considerable inventory may be tied up in the garment plant introducing excessive costs to the manufacturer. Further, accumulating workpieces in such piles tends to make accurately updated quality control inspections more difficult to accomplish.

As disclosed in the above mentioned U.S. Pat. No. 4,615,273 a conveyorized transport system provides a main rail upon which workpiece trolleys ride, and closed subsidiary work station loops located alongside this main rail. Each such loop leads to and from an individual work station. Switching means is provided for each such subsidiary loop for transferring trolleys between the main rail and such subsidiary loops. These loops each have an entrance and an exit end, the entrance end being adjacent to the exit end relative to the general direction of trolley movement on the main rail or track of the conveyor system. This transfer switch is able to deliver a trolley to the entrance and to receive a trolley from the exit of each loop. The configuration of each loop provides flexibility in routing because it allows trolleys to be routed in two or more ways from an exit of a subsidiary loop. The main rail and subsidiary loop each have a gap and a transfer switch is provided to shunt trolleys therebetween. Such a switch comprises a rail section that can be moved during switching from a first position bridging a gap in the main rail to a second position aligned with the entrance end of the subsidiary loop to provide for transfer of the trolley from the main rail to the subsidiary loop. This type of switch also allows the trolley to be routed from one subsidiary loop to another located directly across the main rail, or vice versa, or from a discharge or exit end of the subsidiary loop directly to the entrance of the same subsidiary loop for recirculation.

The prior art disclosures referred to above teach that each closed subsidiary loop comprises an inclined gravity rail for feeding the trolleys to and through a work station, with an elevator means provided for lifting the trolleys from the lower end of the gravity rail to (a point and to a level) position where the trolleys can be reloaded on the main conveyor rail.

The primary aim of the present invention is to provide an improved escapement means between the work station and the elevator means for accumulating trolleys on the gravity rail and for accelerating the trolleys individually into the elevator means or into a transfer slide assembly such as shown in the application referred to above, and filed Sept. 26, 1988 under Ser. No. 249,442.

SUMMARY OF THE INVENTION

The present invention resides in a trolley transport system wherein workpiece supporting trolleys travel by gravity along an inclined rail, and wherein each trolley is held at least momentarily at a work station and then released. The improvement of the present invention comprises escapement means for the trolleys so released from the work station for further travel along the rail into a position for transfer into an elevator mechanism that returns the trolleys to a powered conveyor. Fixed brackets are provided for the fixed gravity rail and in accordance with the present invention a fixed bracket is provided for the escapement means. A laterally extending pivot pin is defined in the bracket means, and is oriented perpendicular to the direction of travel of the trolleys on the rail. This pivot pin is located above the upper end of the trolleys and is oriented transversely with respect to the direction of trolley travel. A trolley camming bellcrank is pivotally supported on this laterally extending pivot pin and the bellcrank has a generally central opening that receives the pivot pin. Opposed surfaces are provided on the bellcrank for holding back a stack of trolleys, and for accelerating the first trolley in the stack into position for transfer into the elevator means referred to previously. More specifically, the bellcrank has a stop surface for abutting the first trolley in the stack and holding the trolleys in stacked relationship upstream of a predetermined position relative to the elevator means. The bellcrank further includes a trolley camming surface for propelling the first trolley in the stack downstream. Means is provided for pivoting the bellcrank from a first position toward a second position angularly spaced relative the first position. In then first position the stop surface holds the stack of trolleys on the rail and in the second position the first trolley is accelerated downstream even as the upstream trolleys are continued to be held in stacked relationship on the guide rail.

BRIEF DESCRIPTION OF THE DRAWINGS

FIG. 6 is a view similar to FIG. 5, but illustrating the escapement mechanism after the first trolley in the stack has been accelerated for movement in a downstream direction on the gravity rail and into a transfer slide assembly or other means for handling individual trolleys entering the elevator mechanism that returns the trolleys to the main conveyor.

DETAILED DESCRIPTION

Figure 1:
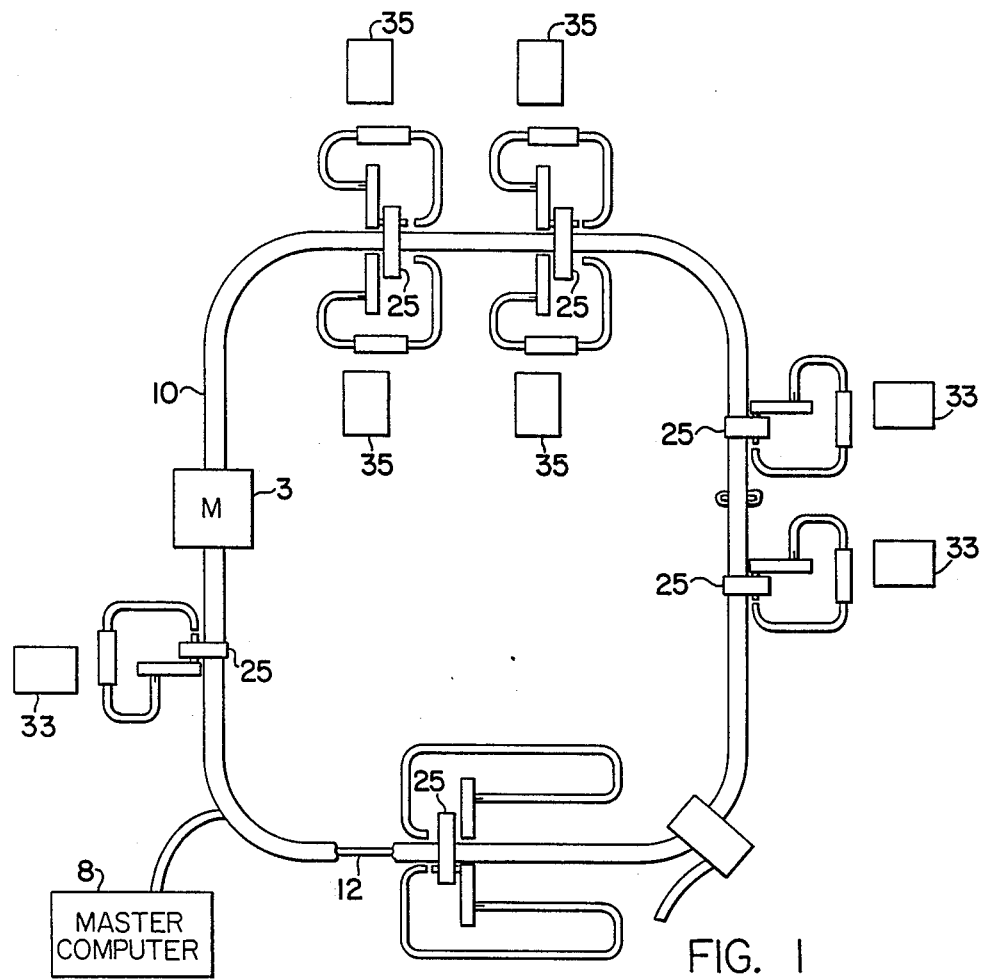
FIG. 1 is a top plan view of a conveyorized transport system such as that shown in U.S. Pat. No. 4,615,273.

Referring now to the drawings in greater detail, FIG. 1 illustrates a workpiece conveyor system of the type shown and described in U.S. Pat. No. 4,615,273. As described in that patent a computer 8 provides the necessary control signals for operating the conveyorized transport system. The conveyor track 12 is housed in a support structure 10 and a drive unit 3 moves pushers (not shown) that propel trolleys, such as that illustrated at 14 in FIG. 2, along this main conveyor track or rail 12.

A plurality of closed subsidiary loops are provided to lead these trolleys to and from individual work stations 33, 35 and as described in said U.S. Pat. No. 4,615,273 transfer switches 25 are also provided for systematically shunting these trolleys from the main conveyor track 12 onto an upper end of each subsidiary loop conveyor structure in order to permit a predetermined task to be performed on the workpiece at a predetermined work station.

Figure 2:
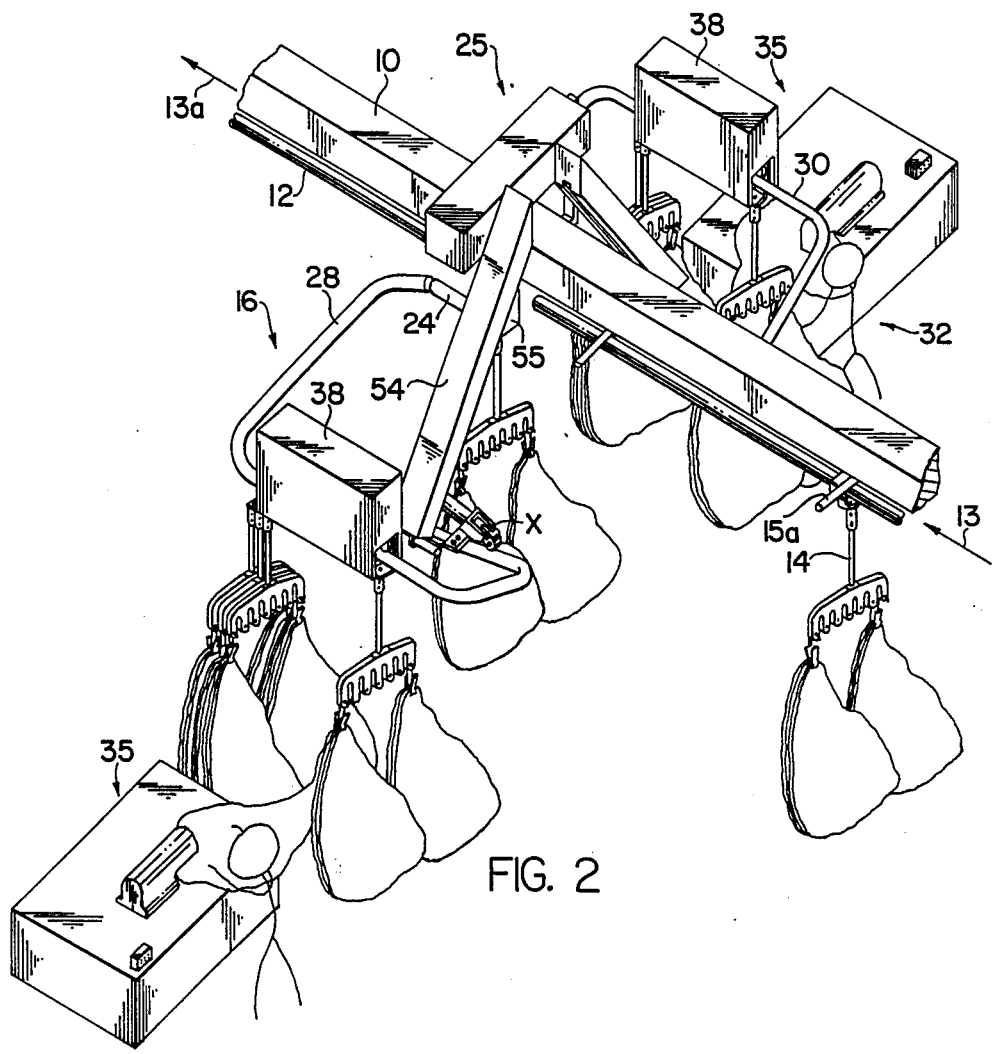
FIG. 2 is a perspective view of a portion of the main conveyor track plus two oppositely disposed closed subsidiary loop associated with two work stations, and also shows a single transfer switch so arranged as to shunt trolleys from the main conveyor onto one or the other of these subsidiary loops, or to shunt such trolleys directly between such work stations.
Figure 3:
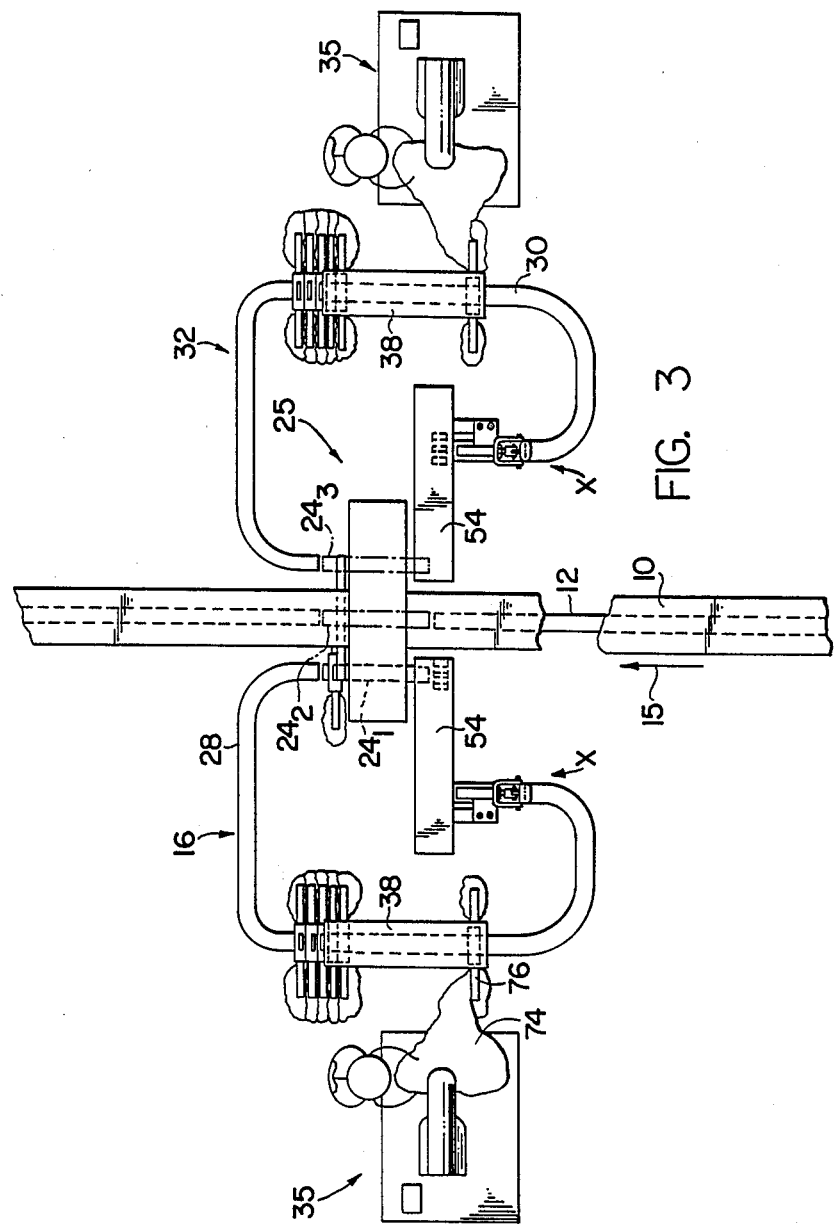
FIG. 3 is a top view of the apparatus illustrated in FIG. 2 showing the transfer switch in its various alternative positions, and also showing the general location for the escapement means of the present invention.
Figure 4:
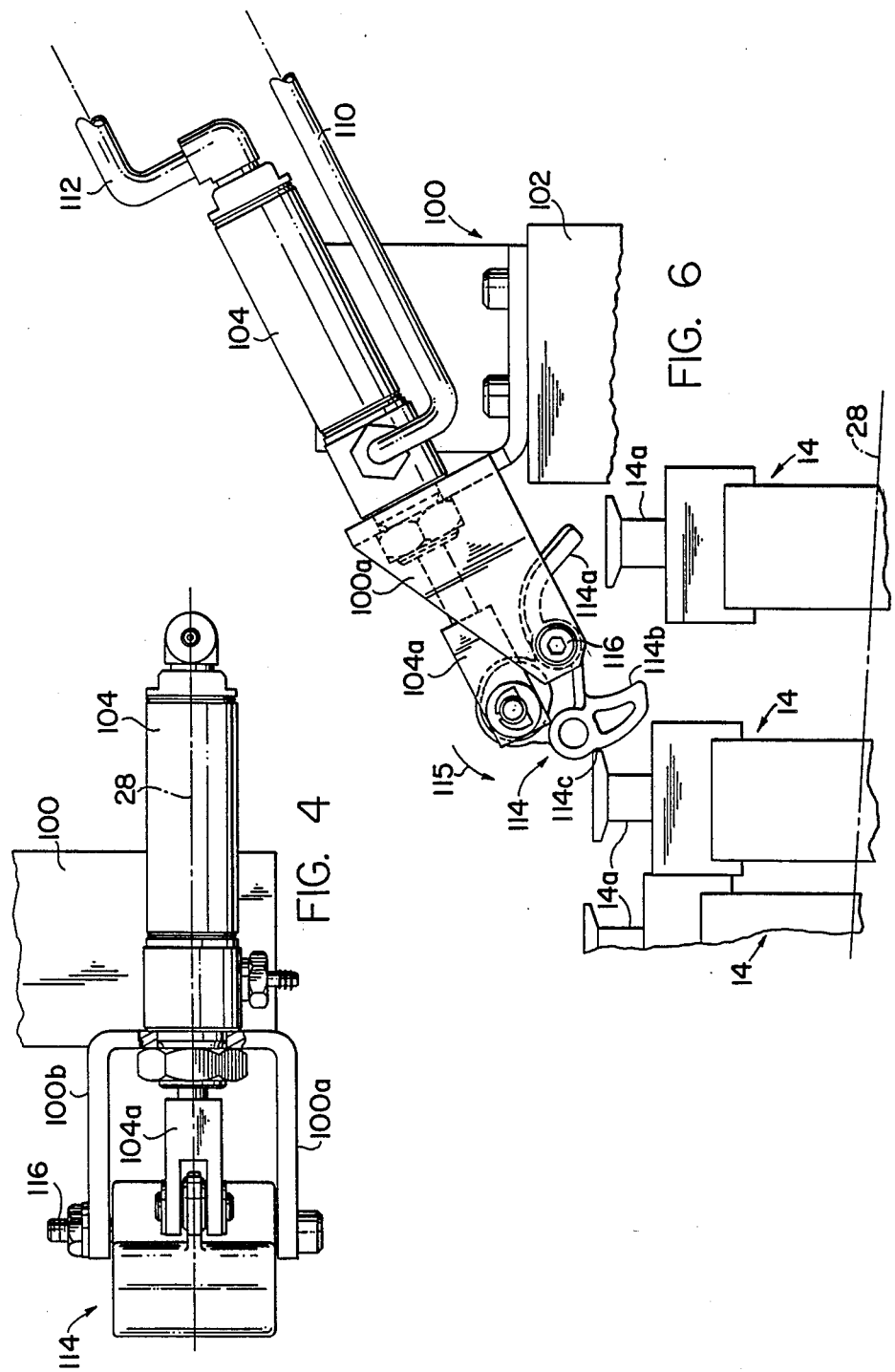
FIG. 4 is an enlarged plan view of one escapement mechanism at one of the FIG. 3 locations, as constructed in accordance with the present invention, and capable of holding back a stack of trolleys (not shown) on a gravity rail (not shown).

FIG. 2 illustrates a portion of the computer controlled conveyorized transport system of FIG. 1 and shows the main track or rail 12 together with a pair of opposed subsidiary loops 16 and 32. One of the trolleys 14a is shown u moving on the main rail or track 12, being propelled by a pusher 15a in the direction of the arrow 13. Such pushers are provided in spaced relationship along a chain (not shown) provided for this purpose in the track structure 10. Thus, the trolleys move in the direction of the arrow 13a on the track 12. At predetermined positions where they are adapted to be supported on a laterally movable member 24 such as shown in FIG. 3. A transfer switch means 25 shunts the member 24 and a trolley provided thereon, into a subsidiary loop.

FIG. 3 illustrates in some detail the relationship between the transfer switch 25 and the main conveyor track 10 and its associated rail 12. The transfer switch illustrated is capable of assuming at least three positions, one where its rail segment 24 is aligned with the main track or rail 12, and opposed left and right hand positions where the transfer switch rail segment 24 is aligned with an upper end of left hand subsidiary loop 16 or with the upper end of a right hand subsidiary loop 32.

These subsidiary or closed loops comprise gravity rails 28 and 30, each loop being associated with a particular work station. Each loop handles a number of trolleys and associated workpieces and an escapement mechanism 38 is provided at each work station to present a workpiece on an individual trolley at that work station as suggested in U.S. Pat. No. 4,667,602. As disclosed therein each subsidiary loop has a rail that slopes continuously downwardly from where the trolleys are taken from the main conveyor and eventually joins with an elevator adapted to reload the conveyors on the main conveyor so that the trolleys can then move along the main track to a succeeding work station loop or the like. The escapement mechanism 38 is provided approximately midway around the subsidiary loop rail and at the work station itself. Each escapement mechanism includes means for stopping the trolleys at the upstream end, and a gate at its downstream end for holding each trolley in position for performing a predetermined task on a workpiece. The escapement mechanism serves to back up the trolleys on the subsidiary loop rail to await attention by an operator on the trolley at the gate. When activated by the operator the escapement mechanism releases a leading one of the trolleys so backed up so that it rolls by gravity to the gate where it is isolated from the other trolleys. The workpieces carried by this trolley is freely accessible to the operator. The operator performs a particular work operation on each of these workpieces in turn as made accessible at the work station, and when completed he then activates the gate to release the trolley to roll by gravity towards the elevator. Another trolley is released by this escapement mechanism for travel to the gate. Although this U.S. Pat. No. 4,667,602 suggests that another escapement mechanism be located at the base of the elevator to release the trolleys one by one for loading, the present invention provides an improvement over such a conventional escapement mechanism whereby these trolleys may not only be backed up or stacked at some position on the gravity rail, but wherein the improved escapement mechanism provides for accelerating the trolley into the elevator, preferably via a transfer slide assembly as shown for example in copending application Ser. No. 249,442. This acceleration of the lowermost trolley on the subsidiary loop rail provides for improved results in the operation of this transfer slide assembly and consequently speeds up the operation of the gravity rail conveyor system for shunting workpieces through each of the work stations in the system.

Prior to discussing this improved escapement mechanism it might be well to summarize briefly the operation of the elevator itself. The elevator has a slotted track section which receives a trolley and more particularly a crown portion to lift the trolley from a position adjacent the lower end of an inclined subsidiary loop rail upwardly toward the switching means for transfer onto the main conveyor. While the elevator car is sized and shaped to receive the crown portion of the trolley, the trolley must be actively and positively pushed or pulled into the elevator car because a trolley travelling down the inclined subsidiary loop rail toward the elevator usually cannot consistently travel from the rail into and through the narrow confines of the elevator car slotted track under the force of its own momentum. The forward momentum of a trolley travelling down the inclined subsidiary loop rail is not available when the subsidiary loop is fitted with an escapement mechanism of the present invention and therefore the present invention provides means for accelerating the trolley into the elevator car and more particularly into a transfer slide assembly of the type disclosed in copending application Ser. No. 249,442. This copending application shows an improvement to U.S. Pat. No. 4,615,273 and the present invention relates to a further improvement whereby the trolley is accelerated as it leaves this improved escapement mechanism at the downstream end of the gravity rail. This improved escapement mechanism is located adjacent to the entry to the elevator and more particularly to the transfer slide assembly that feeds each trolley into an elevator car. The elevator is indicated generally at 54 in the drawings and an elevator car at 55. Such a slide assembly is shown in the pending application Ser. No. 249,442 referred to hereinabove. Each car moves from a "down" position upwardly along the path defined by the elevator means 54 to a position where the trolley is moved onto a rail segment such as shown at 24 to be reloaded onto the main conveyor track where it can be moved by one of the pushers 15a as described above.

Figure 5:
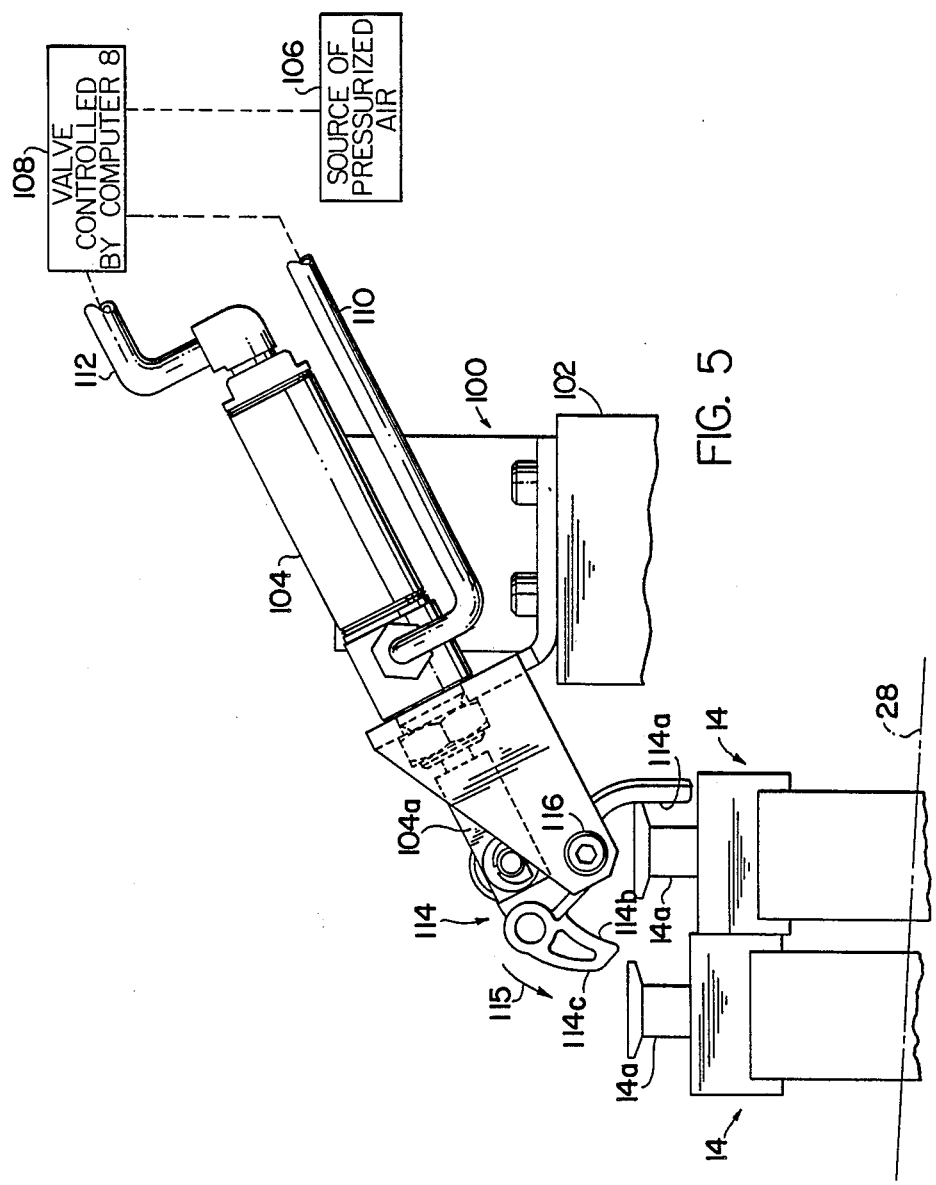
FIG. 5 is a side elevational view of the escapement mechanism and also shows a stack of trolleys held back on the inclined gravity rail, the trolleys being gravity biased toward the right in this view.

Turning now to a description of the escapement mechanism of the present invention, said mechanism is provided at the area indicated generally at X in FIG. 2. This escapement mechanism stacks up trolleys while they wait their turn to be transferred into an elevator car. FIG. 5 shows the escapement of the present invention and the means for so "backing up" or stacking the trolleys at this location. It will be noted that the escapement mechanism of FIG. 5 is located in closely spaced relationship to the elevator means and the transfer slide assembly that positively indexes each trolley into the elevator car. Since providing an escapement mechanism at this point relative to the elevator rail will reduce to next to nothing the potential energy of the trolley, very little energy is available for achieving positive movement of the trolley into the transfer slide. The escapement mechanism of the present invention therefor includes suitable means for accelerating each trolley upon its release.

As shown in FIG. 5 bracket means 100 is secured to fixed structure 102 which structure 102 may comprise the elevator structure 54. The bracket means 100 supports a fluid motor in the form of a pneumatically operated actuator 104. Actuator 104 includes a movable part 104a that is selectively biased to the position shown by air pressure from a source of air 106, through a valve 108 controlled by the computer 8, an air line 110 provides air to the front side of a piston (not shown) and the piston is connected to a piston rod that is in turn connected to clevis 104a. When the computer 8 provides a suitable signal to the valve 108 line 112 is pressurized causing the rod and clevis, or movable portion 104a, to extend pivoting a bellcrank 114 from the position shown in FIG. 5 to that shown in FIG. 6 pivoting a bellcrank 114 in the counterclockwise direction indicated generally by the arrow 115 in FIG. 5.

The bellcrank 114 is pivotably supported on a laterally extending pivot pin 116 provided in a bifurcated portion of the bracket 100, that is between the bifurcations 100a, 100b. This bellcrank 114 includes opposed surface portions that alternately engage the trolley 14, and more particularly the trolley crown portion 14a as described below.

The bellcrank 114 includes a stop surface 114a for abutting a first trolley 14 in a stack of trolleys providing a means for conveniently storing trolleys adjacent a lower portion of the gravity rail. The gravity rail is indicated schematically by the line 28 in FIGS. 5 and 6. The bellcrank 114 also includes a camming surface 114b for engaging and propelling the first trolley 14, and again more particularly the trolley crown portion 14a, in a downstream direction as a result of sudden counterclockwise pivoting movement of the bellcrank 114 as achieved by extension of the movable actuator portion 104a from the position shown in FIG. 5 to that of FIG. 6.

The impulse given to the trolley 14 by the surface 114b assures that the trolley 14 will move positively downstream on the gravity rail 28 into a position for either entry directly into the elevator car, or at the least more positive engagement by the transfer slide assembly as described in copending application Ser. No. 249,442.

Return movement of the bellcrank 114 is achieved by reversing the air pressure in the lines 110 and 112 to retract the movable actuator portion 104a. This results in clockwise movement of the bellcrank from the position shown in FIG. 6 back toward the position of FIG. 5. The camming surface 114b has a back side 114c that serves to hold back the stack of remaining trolleys, and more particularly the lowermost trolley in the stack, so that it will assume a position identical to that of the trolley 14 in FIG. 5 assuring sequential operation of the device in a predictable and orderly manner handling trolleys for the transfer slide assembly and elevator.

We claim:

1. In a trolley transport system wherein trolleys travel by gravity along an inclined rail, and wherein each trolley is held at least momentarily at a work station and then released, the improvement comprising escapement means for the trolleys released for further travel along the rail, said escapement means including fixed bracket means defining a laterally extending pivot axis oriented generally perpendicular to the direction of travel of the trolleys so released from the work station, said pivot axis located above the upper ends of the trolleys and oriented transversely with respect to said direction of trolley travel, a trolley camming bellcrank pivotally supported on said laterally extended pivot axis, said bellcrank having a stop surface for abutting a first trolley and creating a stack of trolleys on said rail upstream of the first trolley when in a first position, and said bellcrank having a trolley camming surface for propelling the first trolley downstream as a result of pivoting said bellcrank from said first position toward a second position angularly spaced from said first position, said first trolley camming surface facing said bell crank stop surface to provide selective engagement between the downstream face of the trolley upper end and the stop surface, and camming engagement between the trolley camming surface and the downstream face of the trolley upper end.

2. The combination of claim 1 further comprising a fluid motor having a movable portion connected to said bellcrank for pivoting said bellcrank from said first to said second position.

3. The combination of claim 2 wherein said bellcrank comprises a molded plastic part having an opening generally between said stop surface and said trolley camming surface, and a pivot pin provided in said fixed bracket to define said laterally extending pivot axis, said pivot pin pivotably supporting said bellcrank.

4. The combination of claim 3 wherein said bracket means comprises a bifurcated portion, said bellcrank provided between the furcations of said bifurcated portion.

5. The combination of claim 4 wherein said bracket means further comprises a laterally extending wall connecting said furcations and defining an opening, said fluid motor having a fixed part secured to said bracket wall.

6. The combination of claim 5 wherein said plastic molded bracket has an integrally formed tab portion generally between said camming surface and said pivot pin opening and offset with respect to a line connecting said camming surface and said pivot pin opening.

7. The combination of claim 6 wherein said fluid motor movable portion comprises a reciprocable actuator said actuator having a free end means, coupling said actuator free end to bracket means tab portion.

8. The combination of claim 7 wherein said means coupling said actuator free end to said tab portion comprises a pin oriented parallel said pivot axis defining pivot pin for supporting said bellcrank, said pin provided loosely in a slot to adapt the linear reciprocating movement of said fluid motor movable portion to the pivotal movement of said bellcrank.

9. In a trolley transport system wherein trolleys travel by gravity along an inclined rail, and wherein each trolley is held at least momentarily at a work station and then released, the improvement comprising escapement means for the trolleys released for further travel along the rail, said escapement means including fixed bracket means defining a laterally extending pivot axis oriented generally perpendicular to the direction of travel of the trolleys so released from the work station, said pivot axis located above the upper ends of the trolleys and oriented transversely with respect to said direction of trolley travel, a trolley camming bellcrank pivotally supported on said laterally extended pivot axis, said bellcrank having a stop surface for abutting a first trolley and creating a stack of trolleys on said rail upstream of the first trolley when in a first position, and said bellcrank having a trolley camming surface for propelling the first trolley downstream as a result of pivoting said bellcrank from said first position toward a second position angularly spaced from said first position, said bell crank comprising a molded plastic part having an opening between said stop surface and said trolley camming surface, a pivot pin provided in said fixed bracket and defining said laterally extended pivot axis, said pivot pin pivotably supporting said bell crank, said fluid motor having a fixed part secured to a wall in said bracket, and said fluid motor further including a moveable portion connected to said bell crank for so pivoting the bell crank between said first and second positions.

10. The combination of claim 9 wherein said plastic molded bracket has an integrally formed tab portion generally between said camming surface an said pivot pin opening and offset with respect to line connecting said camming surface and said pivot pin opening.

11. The combination of claim 10 wherein said fluid motor movable portion comprises a reciprocable actuator said actuator having a free end means, coupling aid actuator free end to bracket means tab portion.

12. The combination of claim 11 wherein said means coupling said actuator free end to said tab portion comprises a pin oriented parallel said pivot axis defining pivot pin for supporting said bellcrank, said pin provided loosely in a slot to adapt the linear reciprocating movement of said fluid motor movable portion to the pivotal movement of said bellcrank.

* * * * *